United States Patent Office 3,706,798
Patented Dec. 19, 1972

3,706,798
BISOXALIC ACID DIAMIDES
Max Dunnenberger, Frenkendorf, Basel-Land, and Hans Rudolf Biland, Gelterkinden, Basel-Land, Switzerland, assignors to Ciba-Geigy AG, Basel, Switzerland
No Drawing. Filed Apr. 12, 1971, Ser. No. 133,377
Int. Cl. C07c *103/32*
U.S. Cl. 260—559 A                5 Claims

ABSTRACT OF THE DISCLOSURE

New bisoxalic acid diamides are stabilisers for organic materials. They are prepared by reacting an oxalic acid monoamide or the chloride or an ester thereof with an alkylendiamine.

DETAILED DESCRIPTION

It is already known that a large number of bisoxalic acid diamides can be used as ultraviolet absorbers.

It has now been found by a further study of this field that a selected group of new bisoxalic acid diamides possess, as anti-oxidants, outstanding properties which are lacking in compounds of very similar constitution.

These new bisoxalic acid diamides correspond to the formula (1)
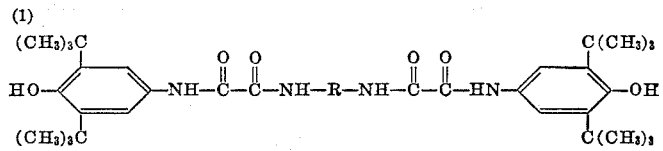

wherein R represents an alkylene radical having 5 to 18 carbon atoms.

The alkylene radical R in Formula 1 can be branched or, preferably, unbranched.

Of particular practical interest, especially as anti-oxidants for poly-α-olefins, are bisoxalic acid diamides of the formula (2)
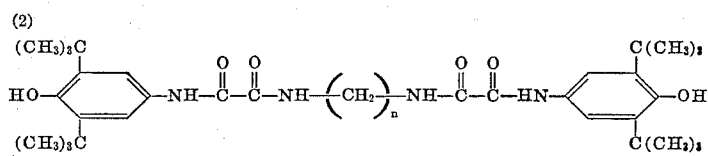

wherein $n$ represents a whole number from 6 to 10.

Preferred compounds within the scope of Formula 2 correspond to the formula (3)
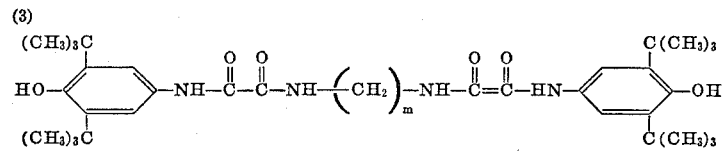

wherein $m$ represents a whole number from 6 to 8.

The above characterised compounds can be produced by process analogous to processes known per se.

Basically, a compound of the formula (4)
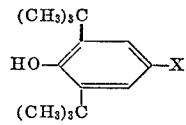

is thereby reacted with a compound of the formula (5)                X'—R—X'

X and X' represent either —NH$_2$ or

—NH—CO—CO—Y wherein Y stands for —Cl, —OH or an alkoxy group having 1 to 12 carbon atoms. R has the above given meaning. X and X' must be different in the two reactants. This means that one mole of a compound of the formula (6)
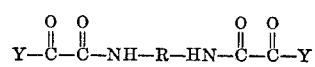

wherein Y and R have the given meaning is reacted with 2 moles of 3,5-di-tert.butyl-4-hydroxy-aniline; or 1 mole of a diamine of the formula (7)                NH$_2$—R—NH$_2$ wherein R has the given meaning is reacted with 2 moles of a compound of the formula (8)
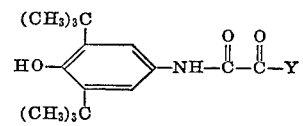

wherein Y has the given meaning.

In Formula 6 the symbol Y hereby represents preferably chlorine, whilst in Formula (8) it preferably stands for an alkoxy group having 1 to 12 carbon atoms.

The condensation according to the above defined reaction is performed, depending on the reactivity of the functional group to be reacted, at temperatures between 0 and 250° C. in a solvent inert to the reactants, or in the melt, optionally in the presence of a condensation catalyst. Preferred condensation catalysts are tertiary amines such as triethanolamine and pyridine, also acids such as boric acid and p-toluenesulphonic acid.

The amount of catalyst to be used is, in general, 0 to 10 percent by weight, relative to the total weight of the reactants. Preferably, the reaction is performed in a solvent at a temperature of 30 to 80° C. Suitable solvents are, for example, aromatic hydrocarbons, or aromatic halogenated hydrocarbons such as benzene, toluene, p-cymol, chlorobenzene, di- and trichlorobenzene, alcohols or ethers, such as methanol, ethanol, ethylene glycol, diethylene glycol, triethylene glycol, glycerin, ethylene glycol monomethyl ether, diethylene glycol diethyl ether, and dioxane, or also methylene chloride.

The compound of Formula 8 wherein Y represents alkoxy is produced, for example, by reaction of 1-amino-3,5-di-tert.butyl-4-hydroxybenzene with oxalic acid mono-alkylester-chloride in benzene with pyridine as HCl-acceptor.

The described new compounds constitute valuable anti-oxidants, i.e. they are suitable for the stabilisation of organic materials to oxidative decomposition, by which is meant, in particular, thermally accelerated oxidations. Materials which can be protected are: homo- and co-polymerisates made from ethylenically unsaturated compounds such as vinyl chloride, vinylidene chloride, styrene, butadiene, isoprene, ethylene, propylene, acrylic- and methacrylic acid derivatives, e.g. acrylic acid alkyl ester, acrylic acid amides, and acrylonitrile; polamides, e.g. made from ε-caprolactam, or from adipic acid and a diamine; polyesters such as terephthalic acid glycol polyesters; natural and synthetic rubbers; lubricating oils; benzines; vegetable and animal oils and fats; waxes; cellulose and cellulose derivatives such as cellulose ester.

To be specially emphasised is the excellent anti-oxidant effect of the above defined compounds in the case of polymerisate synthetic materials, particularly poly-α-olefins such as polypropylene.

Sufficient for a good anti-oxidant effect is, in general, an amount of 0.01 to 5%, preferably 0.1 to 2% of the compounds according to the invention, relative to the substrate to be protected. The anti-oxidants can be worked on their own into the materials to be protected, or together with other additives such as softeners, pigments, protective agents against light-rays (UV-absorbers), secondary anti-oxidants, optical brighteners, with or without the aid of solvents.

The good stabilising effect of the new compounds is shown, e.g. under accelerated ageing conditions at temperatures above 100° C. A polypropylene subjected to these conditions which contains an anti-oxidant does not show signs of a discolouration, or of the material becoming tender, until after a very much longer time than the time required for this to occur in the case of a polypropylene containing no stabiliser.

Where not otherwise stated in the following examples, the term "parts" denotes parts by weight, and the term "percent" denotes percent by weight. The melting points of the new compounds are not corrected.

Example 1

An amount of 6.4 g. of compound of the formula

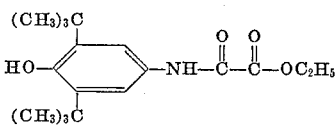

(produced by reaction of 1-amino-3,5-di-tert.butyl-4-hydroxybenzene with oxalic acid monoethyl ester chloride in benzene with pyridine as the HCl-acceptor; melting point: 139 to 140° C.), is refluxed, with stirring, in 60 cubic centimetres of ethanol with 1.2 g. of 1,6-diaminohexane for 3 hours. The reaction mixture is subsequently cooled to 10° C., whereby the product of the formula

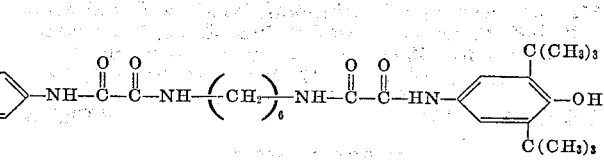

precipitates in the form of colourless crystals. Yield: approximately 7 g. After recrystallisation three times from ethanol, the analytical product melts at 230 to 231° C.

The following compounds of Formula 1 are produced in an analogous manner:

| Formula No. | R | Melting point in ° C. |
|---|---|---|
| 11 | —(CH₂)₇— | 220-221 |
| 12 | —(CH₂)₈— | 219-220 |
| 13 | —(CH₂)₉— | 185-186 |
| 14 | —(CH₂)₁₀— | 120-121 |
| 15 | —(CH₂)₁₁— | 120-121 |
| 16 | —(CH₂)₁₂— | 183-184 |
| 17 | —(CH₂)₃—CH—CH₂— <br>               CH₃ | 124-125 |
| 18 | —(CH₂)₅— | 178-179 |

Example 2

A mixture of 100 parts of stabiliser-free polypropylene (Profax 6501, Hercules Powder) and 0.2 part of a compound according to the below given table is processed on a calendering machine at 170° C. into a soft sheet, and this subsequently pressed at 230° C., and under a pressure of 40 kg./cm.², to form a plate of 1 mm. thickness. The thus obtained plates are subjected at 140° C. (air, normal pressure) to an accelerated oxygen ageing treatment. The time passing before the appearance of the first cracks detectable with the eye is a measure of the anti-oxidative effect of the added compound.

TABLE I

| Added compound: | Time in hours until cracks form at 140° C. |
|---|---|
| Without addition | 5 |
| Commercial anti-oxidants, 2,6-di-tert. butyl-4-methylphenol | 25 |
| Methylene-bis-(3-methyl - 4 - hydroxy - 5 - tert. butylbenzene) | 28 |
| Thio-bis-(2-methyl - 4 - hydroxy - 5 - tert. butylbenzene) | 100 |

TABLE II

Compounds according to the invention

| Compound of the formula: | Time in hours until cracks form at 140° C. |
|---|---|
| (10) | 2250 |
| (11) | 2250 |
| (12) | 2000 |
| (14) | 1830 |

What is claimed is:
1. A bisoxalic acid diamide of the formula

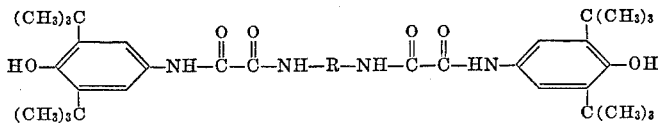

wherein R represents an alkylene radical having 5 to 18 carbon atoms.

2. A bisoxazolic acid diamide according to claim 1 of the formula

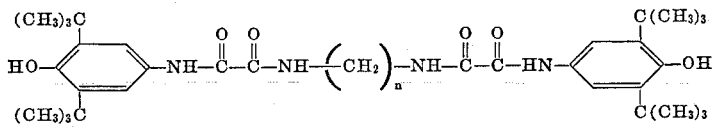

wherein $n$ represents a whole number form 6 to 10.

3. A bisoxalic acid diamide according to claim 1 of the formula

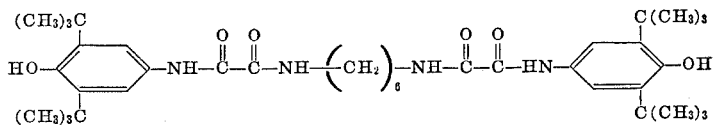

4. A bisoxazolic acid diamide according to claim 1 of the formula

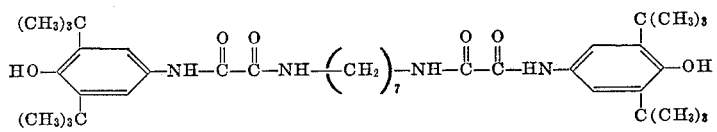

5. A bisoxalic acid diamide according to claim 1 of the formula

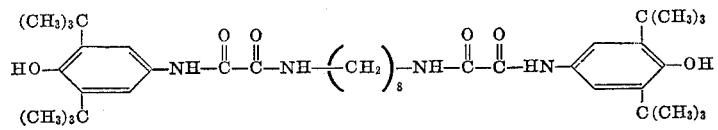

References Cited

UNITED STATES PATENTS 3,256,284   1/1966   Rio _____ 260—559

HENRY R. JILES, Primary Examiner

H. I. MOATZ, Assistant Examiner

U.S. Cl. X.R.

260—45.9 R, 814, 212; 252—403